United States Patent [19]
Friedrich

[11] 3,805,113
[45] Apr. 16, 1974

[54] ELECTRICAL ENERGY DISTRIBUTION SYSTEM
[75] Inventor: Otto Friedrich, Mannheim, Germany
[73] Assignee: Aktiengesellschaft Brown, Boveri & Cie, Baden, Switzerland
[22] Filed: Dec. 13, 1972
[21] Appl. No.: 314,577

Related U.S. Application Data
[63] Continuation of Ser. No. 130,371, April 1, 1971, abandoned.

[30] Foreign Application Priority Data
Apr. 10, 1970 Germany.............................. 2017168

[52] U.S. Cl. .......... 317/27 A, 317/28 B, 317/33 SC
[51] Int. Cl. .............................................. H02h 3/30
[58] Field of Search .... 317/27 A, 28 B, 29 B, 29 R, 317/28 R, 33 C, 33 SC; 307/141.8

[56] References Cited
UNITED STATES PATENTS
2,337,837   12/1943   Reagen.............................. 317/29 B
FOREIGN PATENTS OR APPLICATIONS
88,262   1/1937   Sweden.............................. 317/28 B Primary Examiner—A. D. Pellinen
Assistant Examiner—Patrick R. Salce
Attorney, Agent, or Firm—Pierce, Scheffler & Parker

[57] ABSTRACT

An energy distribution system includes several automatic switches connected in series to a feed line, and energy distribution busbars are connected between adjacent switches in the series. Each switch is provided with a contact release mechanism of the electromagnetic type including an armature for actuating the switch contacts to open position and an operating coil energized in the event of a short-curcuit. In order that only that part of the overall distribution system where the short-circuit occurs shall be disconnected, which means that only that automatic switch which is immediately ahead of the short-circuit, in the direction of the feed line, respond to the short-circuit current, the armature of the contact release mechanism of each switch in the series except the last is retained in a nonoperative position by means of a holding magnet energized from the next following switch of the series.

4 Claims, 3 Drawing Figures

ELECTRICAL ENERGY DISTRIBUTION SYSTEM

This is a continuation, of application Ser. No. 130,371 filed April 1, 1971 now abandoned.

The present invention relates to an electrical energy distributing system with several series-connected automatic switches the contacts of which are separated, in the event of a short-circuit, with current limitation, by means of striking armatures energized by the short-circuit current.

In these energy distribution systems, it is necessary that only the short-circuited part be disconnected in the event of a short-circuit in the system, i.e. only the automatic switch immediately ahead of the short-circuit area should be disconnected, while the unaffected parts of the distribution system should continue to remain operative. When utilizing current-limiting automatic switches, it is not possible to stagger, in time, the disconnecting processes of all automatic switches between the short-circuited area and the feeding point, since all automatic switches must separate their contacts before the short-circuit current attains its full value, in order to achieve a sufficient rapidity during the disconnection and thus a current limitation. This has the result that when a short-circuit occurs, all automatic switches arranged ahead of the short-circuated area will generally respond, and that a selective disconnection of the short-circuited parts of the plant is thus not possible with the use of current-limiting automatic switches. Efforts have been made to remedy this situation by an arrangement whereby, in the event that several series-connected automatic switches respond simultaneously, all automatic switches are immediately closed again which are arranged ahead of that automatic switch located immediately ahead of the short-circuited area. This is accomplished, for example, in that each automatic switch moving automatically into the "off" position emits immediately a re-closing signal to the automatic switch directly ahead of it so that only the automatic switch directly ahead of the short-circuited area can remain in the "off" position. Such an arrangement is disclosed in German Pat. No. 1,300,159. It has also been proposed to effect the re-closing of the automatic switches by a central control device which determines at first the number of the automatically opened switches and then causes the re-closing of all automatic switches except the last one in the series. This arrangement is disclosed in German Patents Nos. 1,174,891 and 1,179,626.

These solutions to the problem are not satisfactory because parts of the system which are not affected by the short-circuit are interrupted, even though only for a short time. Thus, for example, if electromagnetic switching devices with self-holding protection are provided in an industrial plant, the brief absence of the voltage has the effect that these switching devices return to their rest position unless special precautions are taken.

The present invention is based on the problem of permitting the selective opening of the individual automatic switches in energy distribution systems with current limiting in the event of a short-circuit in such a manner that only the automatic switch directly ahead of the short-circuited area opens its contacts, the other automatic switches more remotely located from the short-circuited area remaining closed.

The problem is solved, in accordance with the invention, in that with an energy distribution system of the above described type the striking armatures whose function is to open the switch contacts are held in their rest, i.e. non-operative position in the event of a short-circuit be means of a separately energized holding magnet which is energized by the respective following automatic switch.

The advantages which can be achieved by the invention consist particularly in that the striking armatures of the superordinated automatic switches in the seires, in case of a short-circuit, are prevented from opening by the holdong of their striking armatures together with the short-circuited area the automatic switch immediately ahead of it. If a short-circuit thus occurs in the distribution system at one point, all automatic switches arranged ahead of the short-circuited area will perhaps receive a release impulse, but simultaneously with this release impulse the automatic switch immediately ahead of the short-circuited area will emit a signal for holding the striking armature of the automatic switch ahead of it, and this automatic switch will, in turn, send a signal to the preceding automatic switch. The striking armatures of the automatic switches will thus be retained in their rest position so that only the automatic switch immediately ahead of the short-circuited area will effect the elimination of the short-circuit.

Energy stored in a condenser is preferably utilized for holding the striking armatures in their rest position, the energy being released by means of a control device which is admitted by di/dt converters arranged in the current path of the following automatic switch.

The invention is further enhanced if the holding time of the striking armature of a superordinated automatic switch achieved by means of the condenser discharge is adjustable and is set, for example, to the total switch-off time of the following automatic switch in the normal case. This adjustment of the holding time, which can be effected in known manner by influencing the discharge curve of the condenser, has the advantage that when an automatic switch is overloaded, which manifests itself in that this automatic switch does not cut off the short-circuit current in its proper time, the automatic switch ahead can still intervene in the disconnecting process. If the striking armature of an automatic switch has thus responded, and if this automatic switch causes, at the same time, the holding of the striking armature of the automatic switch ahead, without itself completing the short circuit switching, the holding of the striker armature of the ahead connected switches ceases after the allotted time, and this switch can intervene in the disconnecting process in time, i.e. within the first half-wave of the short-circuit current.

The foregoing objects and other advantages inherent in the invention will become more apparent from the following detailed description of representative embodiments thereof and from the accompanying drawings wherein.

Figure 1:
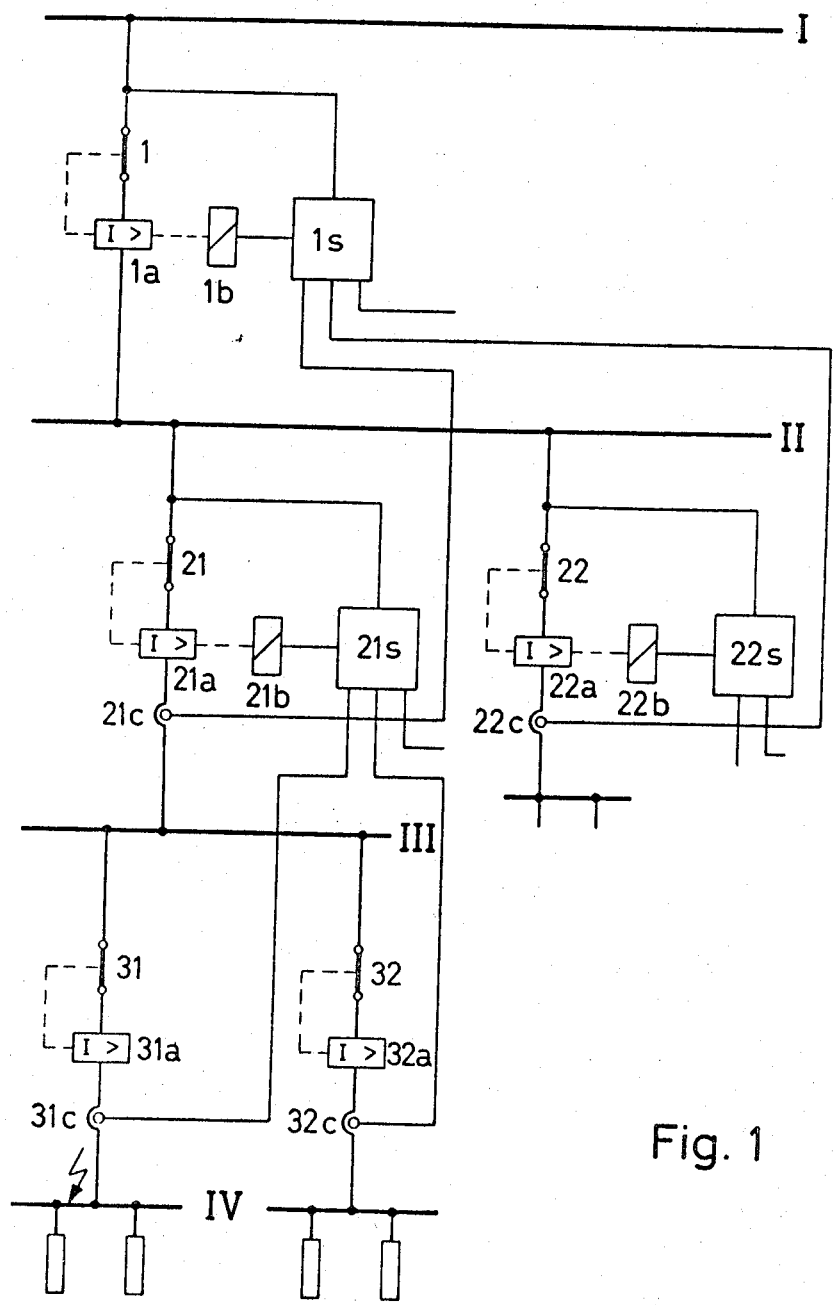
FIG. 1 is a circuit diagram illustrating a three-stage energy distribution system.

With reference now to FIG. 1, a main distributor with an automatic switch 1 is connected to a main feed I which establishes the connection to busbar II of an intermediate distributor. This intermediate distributor has two automatic switches 21 and 22. From busbar II of the intermediate distributor, the line leads over automatic switch 21 to busbar II of the end distributor with the two automatic switches 31 and 32 which serve to connect and disconnect consumer IV.

Each of the above-mentioned automatic switches is provided with an electromagnetic release, 1a, 21a, 22a, 31a, and 32a which can act with a striking armature directly on the contact members of the respective automatic switch so as to separate the contacts, and thus open the automatic switches of a series 1, 21, 31 in the event of a short-circuit so as to limit the current. The striking armatures of the electromagnetic releases 1a, 21a, 22a are, in addition, provided with a holding magnet 1b, 21b, 22b, which functions to retain the respective striking armature in the event of a short-circuit as soon as it receives a corresponding signal from the following automatic switch. For the formation of the necessary signal are arranged in the main current path of the automatic switches of the intermediate and end distributor II and III respectively, measuring instruments 21c, 22c, 31c, 32c which transmit, in the event of a short-circuit current flowing over the measuring point, the holding signal for holding the striking armature of the superordinated automatic switch over a control device 1s, 21s. If a short-circuit occurs, for example, at the point indicated by the arrow, the striking armatures of the electromagnetic releases 31a, 21a, 1a would receive a response impulse for opening directly the contact members of the respective automatic switches 31, 21 and 1. However, measuring instrument 31c transmits a signal to control device 21s which in turn admits holding magnet 21b so that the striking armature of electromagnetic release 21a is retained in its rest position. On the other hand, measuring instrument 21c arranged in the main current path of the automatic switch 21 also transmits a signal to control device 1s, which ensures that the striking armature of electromagnetic release 1a of automatic switch 1 is likewise retained by holding magnet 1b. Automatic switch 31, which is arranged directly ahead of the short-circuited area, can thus actually open.

Figure 2:
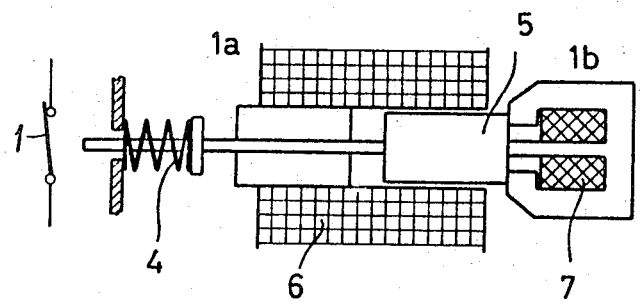
FIG. 2 is a view in central longitudinal section of a striking armature combined structurally with its holding magnet.

As it can be seen from FIG. 2 the electromagnetically operated release 1a for the contacts of an automatic switch can be structured generally in accordance with known principles utilizing an armature of the plunger type. The armature 5 which is designed so as to strike against and open the switch contacts is retained in its rest position by a loading spring 4. Energization of coil 6 serves to draw the armature 5 to the left from the rest position depicted in FIG. 2 and strike with its left end the switch contacts, not shown in this view. Coil 6 would be energized in the event of a short-circuit. A holding magnet 1b is provided adjacent the right end of the release structure 1a and this magnet includes an energizing coil 7. When coil 7 is energized, the magnetic forces created in the poles of the magnet cause the right end face of armature 5 to be attracted and thus hold the armature in the illustrated rest position even though coil 6 has been energized. Thus, armature 5 can only be actuated to the left when coil 7 is not energized.

Figure 3:
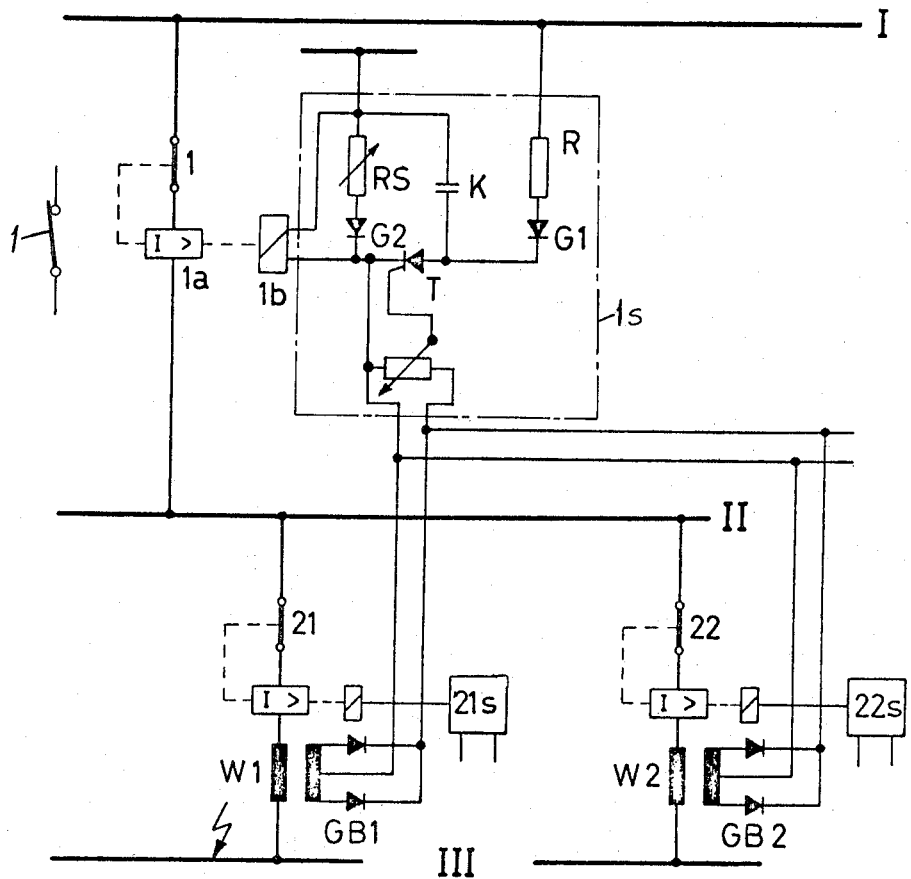
FIG. 3 is also a circuit diagram illustrating a two-stage energy distribution system together with a detailed circuit arrangement for controlling energization of the holding magnet.

Energization of the holding magnet 1b can be effected in any suitable manner but is preferably accomplished by the discharge current of a condenser K connected into a control circuit as illustrated in FIG. 3. Condenser K is continuously connected to the mains I by way of a charging circuit which includes a rectifier G1 connected in series with a resistor R and is thus in a constantly charged state. Discharge of the condenser into the coil 7 of the holding magnet 1b is effected by a switching thyristor T which is ignited by means of a control device 1S which is admitted by di/dt converters W1 and W2. If a short-circuit appears at the point in FIG. 3 indicated by the arrow, the control device 1S receives by way of converter W1 and the center tapped rectifier circuit GB1 a corresponding voltage pulse which serves to ignite thyrstor T, depending upon the magnitude of the rate of increase of the current as measured by converter W1. Ignition of thyristor T thus causes this element to conduct and hence connect condenser K through to the coil 7 so that the discharge current from the condenser flows into coil 7 of the holding magnet 1b, thus to apply a holding force to armature 5 so that the switch contacts of the automatic switch 1 cannot possibly open. Automatic switch 21 must therefore along cut off the short-circuit current. The energy transmitted to coil 7 can be discharged by means of an adjustable resistor RS and a rectifier G2 connected in series therewith, so that the holding time is set within certain desired limits, which has the advantage that the switch-off time of any automatic switch can be adjusted.

It should be mentioned that it is not necessary in the energy distribution system according to the invention to equip the last of the series-connected automatic switches, for example, the automatic switch 31, or 32 in FIG. 1 with holding magnets for their electromagnetic releases since as to these switches there is no necessity to hold the striking armature against movement when the release signal is received.

I claim:

1. An energy distribution system comprising a number of automatic switches connected in series to a feed line, energy distribution busbars connected between adjacent switches in the series, each said switch being provided with a current overload responsive contact release device constituted by an electromagnetic structure including an actuating coil energized in accordance with the current flowing through the switch and an armature which upon energization of said coil acts directly upon and effects release of the switch contacts, electromagnetic holding means including a holding coil energized for a predetermined time period in response to the current flow through the next-following switch in the series in the direction away from said freed line, the magnetic force produced by said holding coil serving to attract and hold said armature temporarily against actuation in the contact release direction notwithstanding the fact that said actuating coil is in an energized state, and means for temporarily energizing said holding coil by the discharge of energy stored in a condenser, said holding coil and condenser being connected in a circuit including switching means which are closed in response to a signal dependent upon the rate-of-increase of the current flow through the next-following switch in the series in the direction away from said feed line.

2. An energy distribution system as defined in claim 1 and which includes a variable resistance connected in parallel with said holding coil to regulate the discharge time of said condenser and hence also the period of time that said holding coil is energized.

3. An energy distribution system as defined in claim 1 and which further includes a charging circuit for said condenser and which is continuously connected to an energy source.

4. An energy distribution system as defined in claim 1 wherein said signal which is dependent upon the rate-of-increase of the flow of current $i$ through the nest-following switch in the series is derived from a di/dt converter connected into the current circuit of said next following switch.

* * * * *